(12) United States Patent
Gao et al.

(10) Patent No.: US 7,001,962 B2
(45) Date of Patent: Feb. 21, 2006

(54) OLEFIN POLYMERIZATION CATALYST SYSTEM

(75) Inventors: Xiaoliang Gao, Calgary (CA); Jessie Leighton, Calgary (CA); Matthew Gerald Kowalchuk, Calgary (CA); P. Scott Chisholm, Calgary (CA)

(73) Assignee: Nova Chemicals (International) S.A., (CH)

( * ) Notice: Subject to any disclaimer, the term of this patent is extended or adjusted under 35 U.S.C. 154(b) by 125 days.

(21) Appl. No.: 10/663,129

(22) Filed: Sep. 16, 2003

(65) Prior Publication Data

US 2004/0097364 A1 May 20, 2004

(30) Foreign Application Priority Data

Sep. 24, 2002 (CA) .................................. 2405241

(51) Int. Cl.
*C08F 4/646* (2006.01)
(52) U.S. Cl. .................. 526/116; 502/113; 502/154; 526/113; 526/114; 526/160; 526/161; 526/943
(58) Field of Classification Search ................ 526/116, 526/161, 114, 113, 160, 943; 502/113, 154
See application file for complete search history.

(56) References Cited

U.S. PATENT DOCUMENTS

| | | | |
|---|---|---|---|
| 2,924,593 A | 2/1960 | Breslow | 260/94.9 |
| 3,231,550 A | 1/1966 | Manyik et al. | 260/88.2 |
| 4,404,344 A | 9/1983 | Sinn et al. | 526/160 |
| 4,543,399 A | 9/1985 | Jenkins, III et al. | 526/70 |
| 4,808,561 A | 2/1989 | Welborn, Jr. | 502/104 |
| 5,198,401 A | 3/1993 | Turner et al. | 502/155 |
| 5,352,749 A | 10/1994 | DeChellis et al. | 526/68 |
| 5,434,116 A | 7/1995 | Sone et al. | 502/103 |
| 5,554,775 A | 9/1996 | Krishnamurti et al. | 556/7 |
| 5,637,659 A | 6/1997 | Krishnamurti et al. | 526/133 |
| 5,939,347 A * | 8/1999 | Ward et al. | 502/104 |
| 5,965,677 A * | 10/1999 | Stephan et al. | 526/129 |

* cited by examiner

*Primary Examiner*—Caixia Lu
(74) *Attorney, Agent, or Firm*—Kenneth H. Johnson

(57) ABSTRACT

A catalyst system comprises 1) a group 4 organometallic catalyst and 2) an activator comprising a solid zirconium acid component and a metal alkyl. The catalyst system is inexpensive and is highly active for the polymerization of olefins. Preferred organometallic catalysts contain a cyclopentadienyl ligand, a phosphinimine ligand and or a ketimide ligand.

4 Claims, No Drawings

OLEFIN POLYMERIZATION CATALYST SYSTEM

FIELD OF THE INVENTION

This invention relates to olefin polymerizations, especially ethylene polymerization.

BACKGROUND OF THE INVENTION

Breslow et al disclosed the polymerization of ethylene using a metallocene catalyst in U.S. Pat. No. 2,924,593.

The use of an aluminoxane as a cocatalyst for ethylene polymerization catalyst was reported by Manyik et al in U.S. Pat. No. 3,231,550.

Subsequently, Kamisky and Sinn discovered that aluminoxanes are excellent cocatalysts for metallocene catalysts, as disclosed in U.S. Pat. No. 4,404,344.

The use of a supported aluminoxane/metallocene catalyst is further described in, for example, U.S. Pat. No. 4,808,561 (Welborn et al, to Exxon).

Hlatky and Turner disclosed the activation of bis-cyclopentadienyl metallocene catalysts with boron activators in U.S. Pat. No. 5,198,401.

Boron activators and aluminoxane are expensive. Accordingly, a less expensive catalyst activator would be a useful addition to the art. We have now discovered a catalyst activator system comprising i) a solid zirconium acid component and ii) a hydrocarbyl aluminum.

SUMMARY OF THE INVENTION

In one embodiment, the present invention provides a catalyst system comprising:

I) a group 4 organometallic compound having at least one halide ligand; and

II) an activator comprising:
  a) a solid zirconium acid component, and
  b) a metal alkyl.

In a preferred embodiment, the catalyst system is provided in a supported form.

In a particularly preferred embodiment, the group 4 organometallic compound is further characterized by having two halide ligands.

The present invention further provides a process to prepare polyolefins using the catalyst technology of this invention.

DETAILED DESCRIPTION

The catalyst system of this invention must contain a group 4 organometallic compound (sometimes referred to herein as a "catalyst") [discussed in Part I below]; and a metal alkyl [discussed in Part III below]. Preferred catalyst systems are supported on a particulate support as discussed in Part IV below.

Part I: Organometallic Compounds

Particularly preferred organometallic compounds (catalysts) are group 4 metal catalysts defined by the formula:

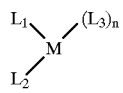

wherein M is selected from titanium, hafnium and zirconium; $L_1$ is selected from the group consisting of cyclopentadienyl, substituted cyclopentadienyl (including indenyl and fluorenyl); $L_2$ is selected from the group consisting of cyclopentadienyl, substituted cyclopentadienyl and heteroatom ligands; and each $L_3$ (each occurrence) is an activatable ligand and n is 1 or 2. It is preferred that n=2 (i.e. that there are 2 monoanionic activatable ligands).

Preferred catalysts include metallocenes (where both $L_1$ and $L_2$ are cyclopentadienyl ligands which may be substituted and/or bridged) and monocyclopentadienyl-heteroatom catalysts (especially a catalyst having a cyclopentadienyl ligand and a phosphinimine ligand), as illustrated in the Examples.

Brief descriptions of exemplary ligands are provided below.

Cyclopentadienyl Ligands $L_1$ and $L_2$ may each independently be a cyclopentadienyl ligand. As used herein, the term "cyclopentadienyl ligand" is meant to convey its broad meaning, namely a substituted or unsubstituted ligand having a five carbon ring which is bonded to the metal via eta-5 bonding. Thus, $L_1$ (and optionally $L_2$) may be unsubstituted cyclopentadienyl; substituted cyclopentadienyl; unsubstituted indenyl; substituted indenyl; unsubstituted fluorenyl; or substituted fluorenyl. An exemplary list of substituents for a cyclopentadienyl ligand includes the group consisting of 1) $C_{1-10}$ hydrocarbyl radical (which hydrocarbyl substituents may be further substituted); 2) a halogen atom; 3) a $C_{1-8}$ alkoxy radical; 4) a $C_{6-10}$ aryl or aryloxy radical; 5) an amido radical which is unsubstituted or substituted by up to two $C_{1-8}$ alkyl radicals; 6) a phosphido radical which is unsubstituted or substituted by up to two $C_{1-8}$ alkyl radicals; 7) silyl radicals of the formula —Si—$(R^X)_3$ wherein each $R^x$ is independently selected from the group consisting of hydrogen, a $C_{1-8}$ alkyl or alkoxy radical $C_{6-10}$ aryl or aryloxy radicals; and 8) germanyl radicals of the formula Ge—$(R^Y)_3$ wherein $R^x$ is as defined directly above.

Activatable Ligands $L_3$ is an activatable ligand. The term "activatable ligand" refers to a ligand which may be activated to facilitate olefin polymerization. Exemplary activatable ligands are independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals; a phosphido radical which is unsubstituted or substituted by up to two $C_{1-8}$ alkyl radicals.

The number of activatable ligands depends upon the valency of the metal and the valency of the activatable ligand. As previously noted, the preferred catalysts contain a group 4 metal in the highest oxidation state (i.e. $4^+$) and the preferred activatable ligands are monoanionic (such as a halide—especially chloride). Thus, the preferred catalyst contains two halide ligands. In some instances, the metal of the catalyst component may not be in the highest oxidation state. For example, a titanium (III) component would contain only one activatable ligand. Also, it is permitted to use a dianionic activatable ligand although this is not preferred.

Heteroatom Ligands

As used herein, the term "heteroatom ligand" refers to a ligand, which contains a heteroatom selected from the group consisting of nitrogen, boron, oxygen, phosphorus and sulfur. The ligand may be sigma or pi bonded to the metal. Exemplary heteroatom ligands include phosphinimine ligands, ketimide ligands, siloxy ligands amido ligands, alkoxy ligands, boron heterocyclic ligands and phosphole ligands. Brief descriptions of such ligands follow:

Phosphinimine Ligands

Phosphinimine ligands are defined by the formula:

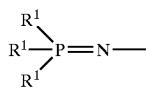

wherein each $R^1$ is independently selected from the group consisting of 1) a hydrogen atom; 2) a halogen atom; 3) $C_{1-20}$ hydrocarbyl radicals which are either unsubstituted or substituted by a halogen atom; 4) a $C_{1-8}$ alkoxy radical; 5) a $C_{6-10}$ aryl or aryloxy radical; 6) an amido radical; 7) a silyl radical of the formula:

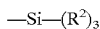

wherein each $R^2$ is independently selected from the group consisting of hydrogen, a $C_{1-8}$ alkyl or alkoxy radical, $C_{6-10}$ aryl or aryloxy radicals; and 8) a germanyl radical of the formula:

wherein $R^2$ is as defined above.

The preferred phosphinimines are those in which each $R^1$ is a hydrocarbyl radical. A particularly preferred phosphinimine is tri-(tertiary butyl) phosphinimine (i.e. where each $R^1$ is a tertiary butyl group).

Ketimide Ligands

As used herein, the term "ketimide ligand" refers to a ligand which:

(a) is bonded to the group 4 metal via a metal-nitrogen atom bond;

(b) has a single substituent on the nitrogen atom, (where this single substituent is a carbon atom which is doubly bonded to the N atom); and (c) has two substituents (Sub 1 and Sub 2, described below) which are bonded to the carbon atom.

Conditions a, b, and c are illustrated below:

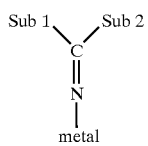

The substituents "Sub 1" and "Sub 2" may be the same or different. Exemplary substituents include hydrocarbyls having from 1 to 20 carbon atoms; silyl groups, amido groups and phosphido groups. For reasons of cost and convenience it is preferred that these substituents both be hydrocarbyls, especially simple alkyls and most preferably tertiary butyl.

Siloxy Heteroligands

These ligands are defined by the formula:

where the—denotes a bond to the transition metal and $\mu$ is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-4}$ hydrocarbyl group such as methyl, ethyl, isopropyl or tertiary butyl (simply because such materials are readily synthesized from commercially available materials).

Amido Ligands

The term "amido" is meant to convey its broad, conventional meaning. Thus, these ligands are characterized by (a) a metal-nitrogen bond, and (b) the presence of two substituents (which are typically simple alkyl or silyl groups) on the nitrogen atom.

Alkoxy Ligands

The term "alkoxy" is also intended to convey its conventional meaning. Thus these ligands are characterized by (a) a metal oxygen bond, and (b) the presence of a hydrocarbyl group bonded to the oxygen atom. The hydrocarbyl group may be a ring structure and/or substituted (e.g. 2, 6 di-tertiary butyl phenoxy).

Boron Heterocyclic Ligands

These ligands are characterized by the presence of a boron atom in a closed ring ligand. This definition includes heterocyclic ligands, which also contain a nitrogen atom in the ring. These ligands are well known to those skilled in the art of olefin polymerization and are fully described in the literature (see, for example, U.S. Pat. Nos. 5,637,659; 5,554,775 and the references cited therein).

Phosphole Ligands

The term "phosphole" is also meant to convey its conventional meaning. "Phosphole" is also meant to convey its conventional meaning. "Phospholes" are cyclic dienyl structures having four carbon atoms and one phosphorus atom in the closed ring. The simplest phosphole is $C_4H_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; silyl or alkoxy radicals.

Phosphole ligands are also well known to those skilled in the art of olefin polymerization and are described as such in U.S. Pat. No. 5,434,116 (Sone, to Tosoh).

Part II: Solid Zirconium Acid

As used herein, the term "solid zirconium acid" refers to a solid acid which is prepared by reacting at least one zirconium complex selected from the group consisting of: zirconium acetate, zirconium hydrogenphosphate, zirconium acetate hydroxide, zirconium hydroxide, zirconium basic carbonate, zirconium sulfate, zirconyl chloride, zirconyl nitrate, (and near analogues thereof) with at least one reagent selected from the group consisting of fluorophosphoric acid, monosodium fluorophosphate, disodium fluorophosphate, trifluoromethane sulfonic acid, phosphoric acid and sulfuric acid (and near analogues thereof).

It is preferred to use approximately equimolar amounts of the zirconium complex and reagent (although different mole rations may be used to produce suitable solid zirconium acids). The reactions may be conducted under mild reaction conditions as disclosed in the examples.

Part III: Metal Alkyl

As used herein, the term metal alkyl compound is referred to a metal alkyl, which may react with surface hydroxyl groups on the preferred silica or alumina supports.

Examples including aluminum, zinc or magnesium complexes having an active alkyl group. Zinc alkyls and magnesium alkyls fall within the scope of this definition as do aluminum complexes, which are defined by the formula:

$Al(R)_a(OR)_b(X)_c$

Aluminum alkyls (such as tri-isobutyl aluminum) are particularly preferred for resins of cost and convenience. Mixtures of different alkyls such as a mixture of an aluminum alkyl and a magnesium alkyl may also be employed.

The metal akyl is absolutely essential to this invention. In the absence of the metal akyl, poor polymerization activities are observed. This is a surprising result, as it may be postulated that an organometallic complex (as described in Part I) having an alkyl ligand may be active in the presence of the solid zirconium and (in the absence of the metal alkyl). However, in practice, it has been found necessary to include the metal alkyl to obtain active catalysts.

Part IV: Catalyst Support

The catalyst system of this invention is preferably supported on a metal oxide. The metal oxide may be calcined using conventional calcining conditions (such as temperatures of from 200° C. to 800° C. for time periods of from 20 minutes to 12 hours).

It is preferred that the metal oxides have a particle size of from about 1 to about 200 microns. It is especially preferred that the particle size be between about 30 and 100 microns if the catalyst is to be used in a gas phase or slurry polymerization process and that a smaller particle size (less than 10 microns) be used if the catalyst is used in a solution polymerization.

Conventional porous metal oxides which have comparatively high surface areas (greater than 1 m²/g, particularly greater than 100 m²/g, more particularly greater than 200 m²/g) are preferred to non-porous metal oxides.

Polymerization Processes

This invention is suitable for use in any conventional olefin polymerization process, such as the so-called "gas phase", "slurry", "high pressure" or "solution" polymerization processes. Polyethylene, polypropylene and ethylene propylene elastomers are examples of olefin polymers, which may be produced according to this invention.

The preferred polymerization process according to this invention uses ethylene and may include other monomers which are copolymerizable therewith such as other alpha olefins (having from three to ten carbon atoms, preferably butene, hexene or octene) and, under certain conditions, dienes such as hexadiene isomers, vinyl aromatic monomers such as styrene or cyclic olefin monomers such as norbornene.

The present invention may also be used to prepare elastomeric co- and terpolymers of ethylene, propylene and optionally one or more diene monomers. Generally, such elastomeric polymers will contain about 50 to abut 75 weight % ethylene, preferably about 50 to 60 weight % ethylene and correspondingly from 50 to 25% of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

The polyethylene polymers which may be prepared in accordance with the present invention typically comprise not less than 60, preferably not less than 70 weight % of ethylene and the balance one or more $C_{4-10}$ alpha olefins, preferably selected from the group consisting of 1-butene, 1-hexene and 1-octene. The polyethylene prepared in accordance with the present invention may be linear low-density polyethylene having density from about 0.910 to 0.935 g/cc. The present invention might also be useful to prepare polyethylene having a density below 0.910 g/cc, the so-called very low and ultra low-density polyethylenes.

The catalyst of this invention is preferably used in a slurry polymerization process or a gas phase polymerization process.

A typical slurry polymerization process uses total reactor pressures of up to about 50 bars and reactor temperature of up to about 200° C. The process employs a liquid medium (e.g. an aromatic such as toluene or an alkane such as hexane, propane or isobutane) in which the polymerization takes place. This results in a suspension of solid polymer particles in the medium. Loop reactors are widely used in slurry processes. Detailed descriptions of slurry polymerization processes are widely reported in the open and patent literature.

In general, a fluidized bed gas phase polymerization reactor employs a "bed" of polymer and catalyst which is fluidized by a flow of monomer which is at least partially gaseous. Heat is generated by the enthalpy of polymerization of the monomer flowing through the bed. Unreacted monomer exits the fluidized bed and is contacted with a cooling system to remove this heat. The cooled monomer is then re-circulated through the polymerization zone together with "make-up" monomer to replace that which was polymerized on the previous pass. As will be appreciated by those skilled in the art, the "fluidized" nature of the polymerization bed helps to evenly distribute/mix the heat of reaction and thereby minimize the formation of localized temperature gradients (or "hot spots"). Nonetheless, it is essential that the heat of reaction be properly removed so as to avoid softening or melting of the polymer (and the resultant-and highly undesirable—"reactor chunks"). The obvious way to maintain good mixing and cooling is to have a very high monomer flow through the bed. However, extremely high monomer flow causes undesirable polymer entrainment.

An alternative (and preferable) approach to high monomer flow is the use of an inert condensable fluid which will boil in the fluidized bed (when exposed to the enthalpy of polymerization), then exit the fluidized bed as a gas, then come into contact with a cooling element which condenses the inert fluid. The condensed, cooled fluid is then returned to the polymerization zone and the boiling/condensing cycle is repeated.

The above-described use of a condensable fluid additive in a gas phase polymerization is often referred to by those skilled in the art as "condensed mode operation" and is described in additional detail in U.S. Pat. Nos. 4,543,399 and 5,352,749. As noted in the '399 reference, it is permissible to use alkanes such as butane, pentanes or hexanes as the condensable fluid and the amount of such condensed fluid preferably does not exceed about 20 weight percent of the gas phase.

Other reaction conditions for the polymerization of ethylene which are reported in the '399 reference are:

Preferred Polymerization Temperatures: about 75° C. to about 115° C. (with the lower temperatures being preferred for lower melting copolymers—especially those having densities of less than 0.915 g/cc—and the higher temperatures being preferred for higher density copolymers and homopolymers); and Pressure: up to about 1,000 psi (with a preferred range of from about 100 to 350 psi for olefin polymerization).

The '399 reference teaches that the fluidized bed process is well adapted for the preparation of polyethylene but further notes that other monomers may be employed—as is the case in the polymerization process of this invention.

Further details are provided by the following non-limiting examples.

EXAMPLES

The following abbreviations are used in the Examples:
1. TIBAL=triisobutyl aluminum
2. wt %=weight percent
3. g=grams
4. mmol=millimol
5. ~=approximately
6. rpm=revolutions per minute
7. Ph=phenyl
8. Me=methyl
9. BEM=butyl ethyl magnesium
10. psig=pounds per square inch (gauge)
11. [$C_2$]=concentration of ethylene (moles per liter)
12. tBu=tertiary butyl
13. Ind=indenyl
14. n-Bu=normal butyl
15. Cp=cyclopentadienyl
16. ml=milliliter
17. TEAL=tri ethyl aluminum General Procedures for Catalyst Preparation To a slurry of a support in heptane, PhNMe$_2$ (optional) diluted in heptane was added and the slurry was stirred for 30 minutes at room temperature. An aluminum alkyl (either TIBAL or TEAL, 2.0–2.5 mmol per gram of support) was then added and the mixture was stirred for an additional 2 to 3 hours. The slurry was then filtrated, and washed twice with heptane to remove the excess of aluminum alkyl. The solid was reslurried into toluene and an organometallic catalyst was added with a Ti loading of 0.037 mmol/g. After one hour of stirring at room temperature, the slurry was filtered, rinsed with toluene, and dried.

Polymerization of Ethylene

General Procedures: Gas phase polymerization was conducted by using a 2 liter, stirred, autoclave reactor at 80 to 90° C. under a total reaction pressure of 200 psig. A seed bed of dry NaCl (160 g) was used. A specified amount of 25% solution of TIBAL was used as a poison scavenger. Some copolymerizations were studied by injecting hexene (5 ml) and/or hydrogen into the reactor.

After the addition of scavenger (and comonomer), ethylene was used to push the catalyst system into the reactor and to bring the reactor pressure to the total pressure of 200 psig. General polymerization conditions are summarized in Table 1.

TABLE 1

Polymerization Reactor Operating Conditions

| | |
|---|---|
| Solvent | 5 ml hexane added with catalyst |
| Operating Mode | Gas Phase |
| Seed Bed | 160 g NaCl |
| Catalyst Charge | Ranges between 10–35 mg |
| Alkyl Scavenger | 25 weight % TIBAL in Hexane (Akzo-Nobel) |
| Al(from alkyl scavenger):M | 250:1 |
| Ethylene | 0.4351–0.5174 molar |
| Hydrogen | 0–0.4 molar |
| Comonomer | 0–0.019 molar Hexene |
| Reaction Pressure | 200 psig |
| Reaction Temperature | 90° C. |
| Reaction Time | 60 minutes |

Polymerization results are summarized in Tables 5–7.

Polymerization in slurry was conducted in a similar reactor with hexane as a diluent.

Example 1

Unsupported Catalyst

Preparation of ZrO(FPO3): A solution of Na$_2$FPO$_3$ (40 mmol, 5.76 g) in distilled water (~40 ml) was slowly added to a stirred aqueous solution (~250 ml) of ZrOCl$_2$ 8H$_2$O (40 mmol, 12.89 g). The solution slowly became a gel-like slurry within about 20 minutes. The content in the flask was stirred for 1 hour at room temperature and was filtered. The solid over the frit was rinsed with water and dried at 135° C. overnight. The weight of the solid was 9.6 g. The solid was powdered and was sieved through a 250 micrometer sieve. Dehydration of the solid was performed at 200° C. for 2 hours under air and 600° C. for 6 hours under nitrogen.

Catalyst Preparation: The calcined solid was used as a support for the preparation of a solid catalyst containing TIBAL and (tri-tertiary butyl phosphinimine) (indenyl) titanium dichloride, or referred to hereinafter as "(t-Bu$_3$PN)(Ind)TiCl$_2$". The way of catalyst preparation was the same as stated in General Procedures for Catalyst Preparation.

Polymerization: 157 mg of the catalyst was loaded in a slurry reactor in 600 ml of hexane. Ethylene was polymerized at 80° C. for an hour under a pressure of ethylene of 225 psi. The amount of polyethylene obtained was 10 g.

Example 2

Supported Catalyst

XPO-2408 silica (from Grace Davison) (10 g) was slurried into an aqueous solution of ZrOCl$_2$ 8H$_2$O (0.5 mmol/g silica, 5 mmol). The slurry was mechanically stirred for 30 minutes. A solution of Na$_2$FPO$_3$ was added very slowly to the slurry. After the addition, the slurry was stirred for 0.5 hours, filtered and the solid was washed twice with distilled water. After being dried at 135° C. overnight, the solid was sieved through a 250 micrometer sieve. The free flowing solid was calcined at 200° C. for two hours under air and 600° C. for six hours under nitrogen.

A catalyst was prepared by using the above support, TIBAL and (t-Bu$_3$PN)(lnd)TiCl$_2$ according to the general procedure. A gas phase run by using 32 mg of the catalyst produced 6.8 g of polyethylene. The activity was 11,388 gPE/mmolTi[C2]hr.

General Procedures for the Preparation of Silica Coated with $Zr(OH)_4$:

XPO-2408 silica and distilled water (~200 ml) was added to a three necked round bottom flask. To this, $ZrOCl_2 \cdot 8H_2O$ dissolved in distilled water was added. The total volume of the slurry was about 300 ml. Concentrated ammonium hydroxide was diluted approximately ten times with distilled water, then added dropwise to the slurry agitated by an overhead mechanical stirrer at 300 rpm. When the pH value reached 9, the addition was stopped, which took about 90 minutes. The solid was filtered, washed thoroughly with distilled water (3×300 ml), dried at 135° C. for 24 hours and sieved over a 250 micrometer sieve. Table 2 summarizes the $Zr(OH)_4$ coated silica.

TABLE 2

Silica Coated with $Zr(OH)_4$

| Entry | Example | Amount of Silica (g) | Zr Loading mmol/g Silica | $NH_4OH$ (28%) (ml) |
|---|---|---|---|---|
| 1 | M1 | 20 | 1.5 | 5 |
| 2 | M2 | 30 | 3.0 | 15 |
| 3 | M3 | 30 | 3.0 | 15 |
| 4 | M4 | 30 | 1.5 | 7.5 |
| 5 | M4 | 30 | 1.5 | 7.5 |
| 6 | M5 | 30 | 1.5 | 7.5 |
| 7 | M6 | 30 | 3.0 | 15 |

General Procedures for $FPO(OH)_2$ and $CF_3SO_3H$ Treated Supports:

Silica coated with $Zr(OH)_4$ was slurried in distilled water. To this, an acid ($FPO(OH)_2$, $CF_3SO_3H$ or $H_2SO_4$) diluted in small amount of distilled water was added slowly to the mechanically stirred slurry. The mixture was stirred for x minutes, then it was filtered, rinsed with distilled water and dried at 135° C. overnight. After being sieved over a 250 micrometer sieve, it was calcined at 200° C. for 2 hours under air and 600° C. for 6 hours under nitrogen. Table 2 summarizes the seven different supports. The catalyst made with these supports are reported in Table 4.

TABLE 3

Acid Treated Supports

| Entry | Support Code | $Zr(OH)_4$ on Silica | Zr Loading mmol/g Silica | Acid Loading mmol/g Silica | Stirring Time (minute) |
|---|---|---|---|---|---|
| 1 | S1 | M1 | 1.5 | 1.5[a] | 20 |
| 2 | S2 | M2 | 3.0 | 3.0[a] | 15 |
| 3 | S3 | M3 | 3.0 | 3.0[a] | 30 |
| 4 | S4 | M4 | 1.5 | 1.5[a] | 30 |
| 5 | S5 | M2 | 3.0 | 1.5[a] | 5 |
| 6 | S6 | M5 | 1.5 | 0.5[b] | 30 |
| 7 | S7 | M6 | 3.0 | 0.45[c] | 20 |

Note:
[a]Fluorophosphoric acid, $FPO(OH)_2$;
[b]$CF_3SO_3H$; and
[c]$H_2SO_4$

TABLE 4

Supported Catalysts on Modified Supports

| Entry | Examples of Catalysts | Support Cod | Support wt (g) | $PhNMe_2$ mmol/g Support | $AlR_3$ mmol/g Support | Organometallic Catalyst* |
|---|---|---|---|---|---|---|
| 1 | C3 | S1 | 2.0 | 0.5 | TIBAL (2.5) | $(t-Bu_3PN)(Ind)TiCl_2$ |
| 2 | C4 | S5 | 2.0 | 0.5 | TIBAL (2.5) | $(nBuCp)_2ZrCl_2$ |
| 3 | C5 | S2 | 2.0 | 0.5 | TIBAL (2.5) | $(t-Bu_3PN)(Ind)TiCl_2$ |
| 4 | C6 | S3 | 2.0 | — | TEAL (2.0) | $(nBuCp)_2ZrMe_2$ |
| 5 | C7 | S3 | 1.0 | 0.5 | TIBAL (2.5) | $(t-Bu_3PN)CpTiCl_2$ |
| 6 | C8 | S3 | 1.0 | — | TEAL (2.0) | $(t-Bu_3PN)(n-BuCp)TiCl_2$ |
| 7 | C9 | S3 | 2.0 | 0.5 | TIBAL (2.5) | $(t-Bu_3PN)(Ind)TiCl_2$ |
| 8 | C10 | S4 | 1.0 | — | TEAL (2.0) | $(t-Bu_3PN)(n-BuCp)TiCl_2$ |
| 9 | C11 | S1 | 1.0 | 0.5 | TIBAL (2.5) | $(nBuCp)_2ZrCl_2$ |
| 10 | C12 | S6 | 2.0 | — | TIBAL (2.0) | $(t-Bu_3PN)(Ind)TiCl_2$ |
| 11 | C13 | S7 | 1.0 | — | TIBAL(2.5) | $t-Bu_3PN)(Ind)TiCl_2$ |

*The loading of the catalyst is 0.037 mmol/g support.

Examples 3 to 12 illustrate inventive polymerizations. Results from Examples 3 to 12 are summarized in Tables 5 to 7.

Example 3

Catalyst C3 (30 mg) was used to polymerize ethylene in a bench scale reactor (BSR). After 1 hour, 46.2 g of polyethylene was obtained, giving an activity of 91,694 gPE/mmolTi[C2]hr.

Example 4

This example was a repeat of Example 3. The activity was 93,300 gPE/mmol[C2]hr.

Example 5

Catalyst C5 was made by the same procedure as for the one used in Example 3. However the loading of Zr and $FPO(OH)_2$ are different. Also the polymerization was performed in another BSR reactor. 39.7 mg of the catalyst was used to produce 49.1 g of polyethylene. The corresponding activity was 66,282 gPE/mmolTi[C2]hr.

Examples 6, 6a and 6b

Catalyst C9 was made similarly to the above three catalyst samples but with a different support. 30 mg of the catalyst produced 34.3 g of polyethylene. The activity of the catalyst was 53,282 gPE/mmolTi[C2]hr.

Catalyst C12 (37.6 mg) was used to polymerize ethylene for 1 hour in a bench scale reactor. 21.1 g of polyethylene was obtained. The calculated activity was 30,000 gPE/mmolTi[C2]hr.

All the above examples have shown that the catalysts outperform the corresponding one with MAO activation as described in Comparative Example 1.

Catalyst C13 (36 mg), made with sulfuric acid modified support, TIBAL and (t-Bu$_3$PN)(Ind)TiCl$_2$, was used to polymerize ethylene for one hour in a bench scale reactor. 23.3 g of polyethylene was produced. The activity was 34,686 gPE/mmolTi[C2]Hr.

Comparative Example 1

A standard catalyst was made by deposition of (t-Bu$_3$PN)(Ind)TiCl$_2$ on XPO-2408 silica supported PMAO-IP. The loading of the Ti is the same as in Examples 3–6. The ratio of Al (from MAO) to Ti was 120:1. Thus 32 mg of this catalyst was used to produce 23 g of polyethylene. The activity was 38,520 gPE/mmolTi[C2]hr. The activity of this standard fall in 30,000 to 40,000 gPE/mmolTi[C2]hr with repeated runs.

Example 7

Catalyst C8 was made by supporting TEAL and (t-Bu$_3$PN)(n-BuCp)TiCl$_2$ on Support S3 with a Ti loading of 0.037 mmol/g. A typical BSR run with 32.9 mg of the catalyst produced 30.5 g of polyethylene. The activity of this catalyst was 49,683 gPE/mmolTi[C2]hr.

Examples 8 and 9

These two examples are the repeats of Example 7 with 3 runs in between Example 7 and Example 8; and two runs between Example 8 and Example 9. The activities are 27,127 and 33,334 gPE/mmolTi[C2]hr respectively.

Example 10

TEAL and (t-Bu$_3$PN)(n-BuCp)TiCl$_2$ was supported on Support S4 to form catalyst C10 with a Ti loading of 0.037 mmol/g. The polymerization was conducted on a different BSR reactor from the one in Examples 7, 8 and 9. A BSR run with 24 mg of the catalyst produced 11 g of polyethylene. The activity of this catalyst was 24,563.5 gPE/mmolTi[C2]hr.

The above four examples indicate that the activity of the catalyst (t-Bu$_3$PN)(n-BuCp)TiCl$_2$ is comparable to the one with MAO activation as described in Comparative Example 2.

Comparative Example 2

(t-Bu$_3$PN)(n-BuCp)TiCl$_2$ was supported on XPO-2408 silica supported MAO (from Albermarle). The Ti loading was 0.037 mmol/g support and the Al:Ti ratio was 120:1. 35 mg of the catalyst was used to produce 22.9 g of polyethylene. The activity was 34,177 gPE/mmolTi[C2]hr.

Example 11

(n-BuCp)$_2$ZrCl$_2$ and TIBAL were supported on Support S5 to form catalyst C4 with a loading of Zr of 0.037 mmol/g support. 37.2 mg of the catalyst was used and 10 g of polyethylene was produced. The activity of the activity was 14,406 gPE/mmolTi[C2]hr.

Example 12

(n-BuCp)$_2$ZrMe$_2$ and TEAL were supported on support S3 to form catalyst C6 with the same loading of Zr as in Example 11. 30 mg of the catalyst produced 6.7 g of polyethylene. The activity of the catalyst was 11,968 gPE/mmolTi[C2]hr.

Comparative Example 3

(n-BuCp)$_2$ZrCl$_2$ was supported on XPO-2408 supported PMAO-IP (from Akzo Nobel) with a ratio of Al:Zr 55:1. 33 mg of the catalyst was used and 40.2 g of polyethylene was produced. The activity was 23,951 gPE/mmolZr[C2]hr.

TABLE 5

Polymerization Results with (t-Bu3PN)(Ind)TiCl$_2$ on Modified Supports

| Example | Cat. Code | Support Code | Cat. Wt (mg) | 1-hexene (ml) | PE (g) | Activity GPE/mmolTi[C2]hr |
|---|---|---|---|---|---|---|
| 3 | C3 | S1 | 27 | 0 | 46.2 | 91,694 |
| 4 | C3 | S1 | 22 | 0 | 38.3 | 93,300 |
| 5 | C5 | S2 | 39.7 | 0 | 49.1 | 66,282 |
| 6 | C9 | S3 | 34.5 | 0 | 34.3 | 53,282 |
| 6a | C12 | S6 | 37.6 | 0 | 21.1 | 30,000 |
| 6b | C13 | S7 | 36 | 0 | 23.3 | 34,686 |

TABLE 6

Polymerization Results with (nBuCp)(t-Bu$_3$PN)TiCl$_2$ on Modified Supports

| Example | Cat. Code | Support Code | Cat. Wt (mg) | 1-hexene (ml) | PE (g) | Activity GPE/mmolTi[C2]hr |
|---|---|---|---|---|---|---|
| 7 | C8 | S3 | 32.9 | 0 | 30.5 | 49,683 |
| 8 | C8 | S3 | 32.4 | 0 | 16.4 | 27,127 |
| 9 | C8 | S3 | 37.3 | 0 | 23.2 | 33,334 |
| 10 | C10 | S4 | 24 | 0 | 11 | 24,563 |

TABLE 7

Polymerization Results with (n-BuCp)$_2$ZrCl$_2$ on Modified Supports

| Example | Cat. Code | Support Code | Cat. Wt (mg) | 1-hexen (mL) | PE (g) | Activity GPE/mmolTi[C2]hr |
|---|---|---|---|---|---|---|
| 11 | C4 | S5 | 37.2 | 0 | 10 | 14,406 |
| 12 | C6 | S3 | 30 | 0 | 6.7 | 11,968 |

What is claimed is:

1. A catalyst system comprising:
   a) group 4 organometallic catalyst having at least one halide ligand;
   k) a solid zirconium acid component; and
   c) a metal alkyl,
wherein said solid zirconium acid comprises zirconium, oxygen and at least one of sulphur or phosphorus.

2. The catalyst system of claim 1 wherein said solid zirconium acid is prepared by reacting 1) at least one zirconium complex selected from the group consisting of:

zirconium acetate, zirconium acetate hydroxide, zirconium basic carbonate, zirconyl chloride, zirconium hydrogenphosphate, zirconium hydroxide, zirconium sulfate, and zirconyl nitrate;

with 2) at least one selected from the group consisting of: fluorophosphoric acid, monosodium fluorophosphates, disodium fluorohosphate, trifluoromethane sulfonic acid, phosphoric acid, and sulfuric acid.

3. A process for the polymerization of olefins in the presence of a catalyst system comprising:

a) a group 4 organometallic catalyst having at least one halide ligand;
b) a solid zirconium acid component; and
c) a metal alkyl, wherein said solid zirconium acid comprises zirconium, oxygen and at least one of sulphur or phosphorus.

4. The process of claim 3 wherein said solid zirconium acid is prepared by reacting 1) at least one zirconium complex selected from the group consisting of:

zirconium acetate, zirconium acetate hydroxide, zirconium basic carbonate, zirconyl chloride, zirconium hydrogenphosphate, zirconium hydroxide, zirconium sulfate and zirconyl nitrate, with 2) at least one reagent selected from the group consisting of: fluorophosphoric acid, monosodium fluorophosphate, disodium fluorophosphate, trifluoromethane sulfonic acid, phosphoric acid and sulfuric acid.

* * * * *